US008939693B2

(12) United States Patent
Taneichi

(10) Patent No.: US 8,939,693 B2
(45) Date of Patent: Jan. 27, 2015

(54) WOOD SCREW

(76) Inventor: Kaoru Taneichi, Atsugi (JP)

(*) Notice: Subject to any disclaimer, the term of this patent is extended or adjusted under 35 U.S.C. 154(b) by 62 days.

(21) Appl. No.: 13/583,380

(22) PCT Filed: Jan. 21, 2011

(86) PCT No.: PCT/JP2011/000322
§ 371 (c)(1),
(2), (4) Date: Sep. 27, 2012

(87) PCT Pub. No.: WO2011/111288
PCT Pub. Date: Sep. 15, 2011

(65) Prior Publication Data
US 2013/0195577 A1  Aug. 1, 2013

(30) Foreign Application Priority Data

Mar. 10, 2010 (JP) ................................. 2010-053060

(51) Int. Cl.
F16B 43/00 (2006.01)
(52) U.S. Cl.
USPC .......................... 411/531; 52/506.05; 411/148
(58) Field of Classification Search
USPC ......... 411/377, 337, 133, 134, 147, 148, 161, 411/371.2, 531, 533, 538; 52/506.05, 512
See application file for complete search history.

(56) References Cited

U.S. PATENT DOCUMENTS

| 1,487,610 | A | * | 3/1924 | Schatzel | 411/533 |
| 1,604,122 | A | * | 10/1926 | Hosking | 411/148 |
| RE19,116 | E | * | 3/1934 | Olson | 411/161 |
| 2,537,575 | A | * | 1/1951 | Crowther | 411/134 |
| 2,746,506 | A | * | 5/1956 | Poupitch | 411/134 |
| 3,133,580 | A | * | 5/1964 | Katz | 411/134 |
| 3,298,270 | A | * | 1/1967 | Launay | 411/542 |
| 4,361,997 | A | * | 12/1982 | DeCaro | 52/512 |
| 4,780,039 | A | * | 10/1988 | Hartman | 411/531 |
| 4,793,757 | A | * | 12/1988 | Peterson | 411/533 |
| 5,040,982 | A | * | 8/1991 | Stefan-Dogar | 433/169 |
| 6,287,857 | B1 | * | 9/2001 | O'Riordan et al. | 435/320.1 |

FOREIGN PATENT DOCUMENTS

JP  59-096418  6/1984
JP  2001-289223  10/2001

* cited by examiner

Primary Examiner — Gary Estremsky
(74) Attorney, Agent, or Firm — Jordan and Hamburg LLP

(57) ABSTRACT

The present invention is configured by a wood screw main body, and a truncated cone-shaped washer that is rotatable in relation to a head of the wood screw main body such that a top surface of the head and a top surface of the truncated cone-shaped washer are substantially on the same plane, and attached so as not to detach from the head. When a retainer element is secured by the wood screw to a wood material to be supported, frictional heat can be prevented from occurring in the retainer element, and the retainer element can be secured by only the fastening force of the wood screw. The retainer element can be efficiently prevented from breaking, and attached such that the head of the wood screw and the surface of the retainer element are on the same plane.

4 Claims, 19 Drawing Sheets

WOOD SCREW

BACKGROUND OF THE INVENTION

The present invention relates to a wood screw.

A conventional wood screw has a head that is formed into a truncated conical shape. The wood screw is used by being attached to a retainer element, such as a wood material, a board, or a cloth-adhered board, that is to be attached to a wood material to be supported, such that the head of the wood screw is on the same plane as the surface of the retainer element.

However, when the wood screw is embedded into the retainer element, the head rotates while pressing against the retainer element by the rotation of the wood screw. Therefore, friction, expansion, and frictional heat occur. The head of the wood screw becomes embedded further into the retainer element than expected, causing a drawback in that the surface of the retainer element breaks.

Japanese Patent Laid-open Publication No. 2001-289223 is related prior art.

SUMMARY OF THE INVENTION

In light of conventional drawbacks such as that described above, an object of the present invention is to provide a wood screw that, when used to secure a retainer element to a wood material to be supported, is capable of preventing frictional heat from occurring in the retainer element, securing the retainer element by only the fastening force of the wood screw, efficiently preventing breakage of the retainer element, and being attached such that the head of the wood screw is on the same plane as the surface of the retainer element.

The above-described object and other objects, as well as novel features of the present invention will become more completely clear when the following description is read with reference to the accompanying drawings.

However, the drawings are provided solely for description, and do not limit the technical scope of the present invention.

To achieve the above-described object, in the present invention, a wood screw is composed of a wood screw main body, and a truncated cone-shaped washer that is rotatable in relation to a head of the wood screw main body such that a top surface of the head and a top surface of the truncated cone-shaped washer are substantially on the same plane, and attached so as not to detach from the head.

As is clear from the description above, the present invention can achieve the following effects:

(1) According to a first aspect, as a result of the truncated cone-shaped washer attached to the wood screw main body, when a retainer element is secured to a wood material to be supported, only the fastening pressing force from the wood screw main body is transmitted to the retainer element. Rotation of the wood screw is performed in a contacting portion with the washer.

Therefore, heat generated in the retainer element as a result of friction with the head of the wood screw that occurred in the past can be prevented with certainty. In addition, breakage of the retainer element as a result of fastening and rotation of the wood screw can be prevented with certainty.

(2) As a result of above-described (1), attachment can be performed such that the head of the wood screw main body, the head of the washer, and the surface of the retainer element are on the same plane.

Therefore, the wood screw can be used in a manner similar to conventional wood screws.

(3) As a result of above-described (1), the wood screw is used in a state in which the wood screw main body is inserted into the truncated cone-shaped washer. Therefore, the wood screw can be used in a manner similar to conventional wood screws.

(4) As a result of above-described (1) even when horizontal misalignment occurs between the wood material to be supported and the retainer element, the misalignment can be changed to that between the truncated cone-shaped washer and the head of the wood screw main body. The surface of the retainer element can be efficiently prevented from being broken by the head of the wood screw main body.

(5) According to a further aspect of the invention, of effects similar to above-described (1) to (3) can be achieved. In addition, as a result of the rotation-preventing projection in the washer, the washer can be prevented from rotating with certainty. The contact surface area with the retainer element increases, and breakage of the retainer element can be efficiently prevented.

(6) According to yet another aspect of the invention, effects similar to above-described (1) to (3) can be achieved. In addition, because the washer does not detach from the wood screw main body, handling is facilitated and the wood screw can easily used.

DETAILED DESCRIPTION OF THE INVENTION

Figure 1:
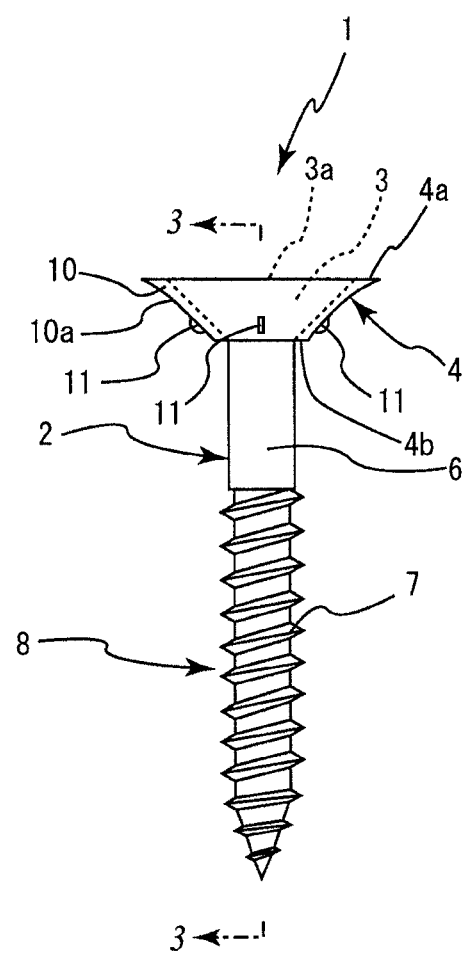
FIG. 1 is a front view according to a first embodiment of the present invention.
Figure 2:
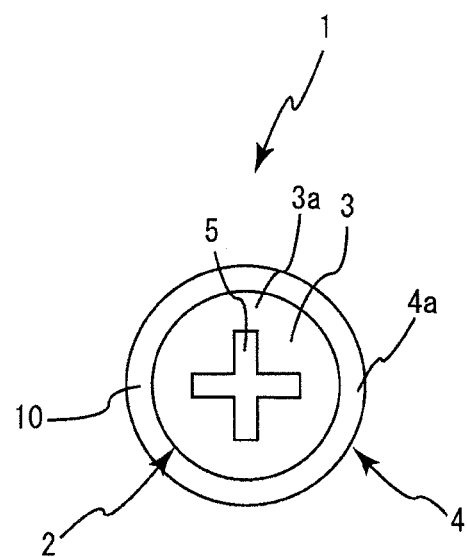
FIG. 2 is a planar view according to the first embodiment of the present invention.
Figure 3:
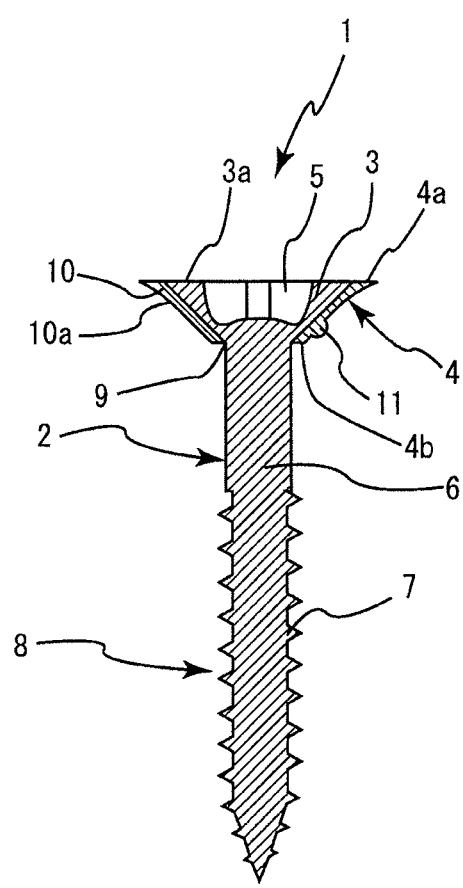
FIG. 3 is a cross-sectional view taken along line 3-3 in FIG. 1.
Figure 4:
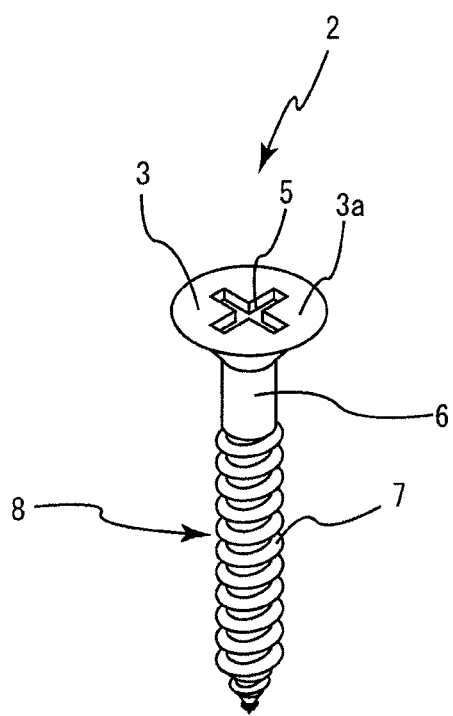
FIG. 4 is an explanatory diagram of a wood screw main body according to the first embodiment of the present invention.
Figure 5:
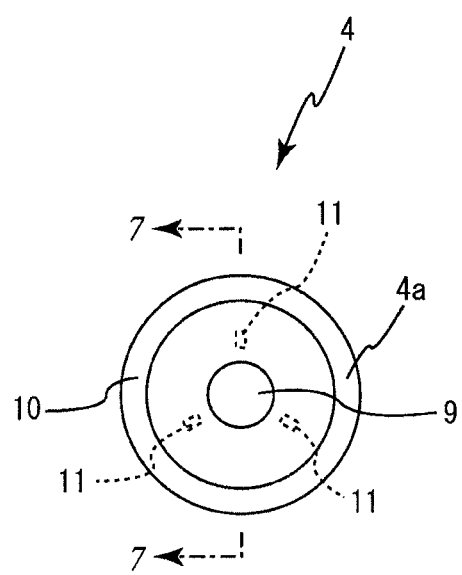
FIG. 5 is a planar view of a washer according to the first embodiment of the present invention.
Figure 6:
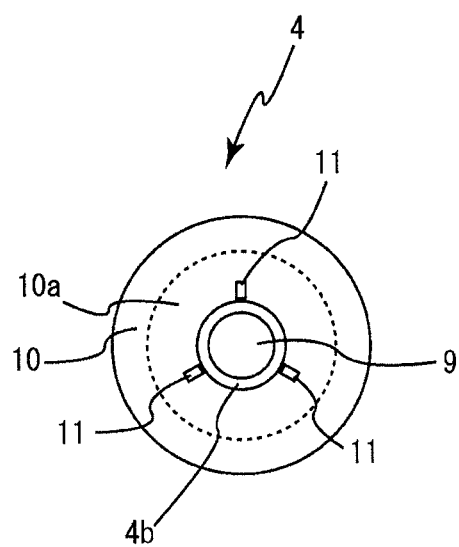
FIG. 6 is a bottom view of the washer according to the first embodiment of the present invention.
Figure 7:
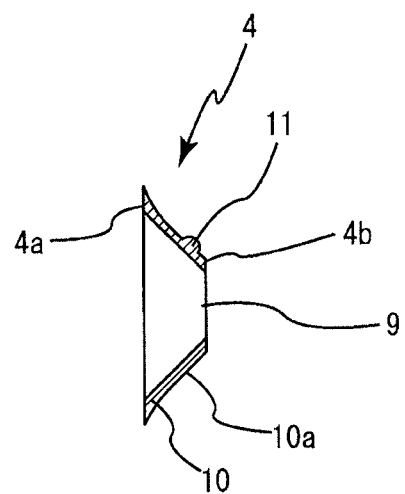
FIG. 7 is a cross-sectional view taken along line 7-7 in FIG. 5.
Figure 8:
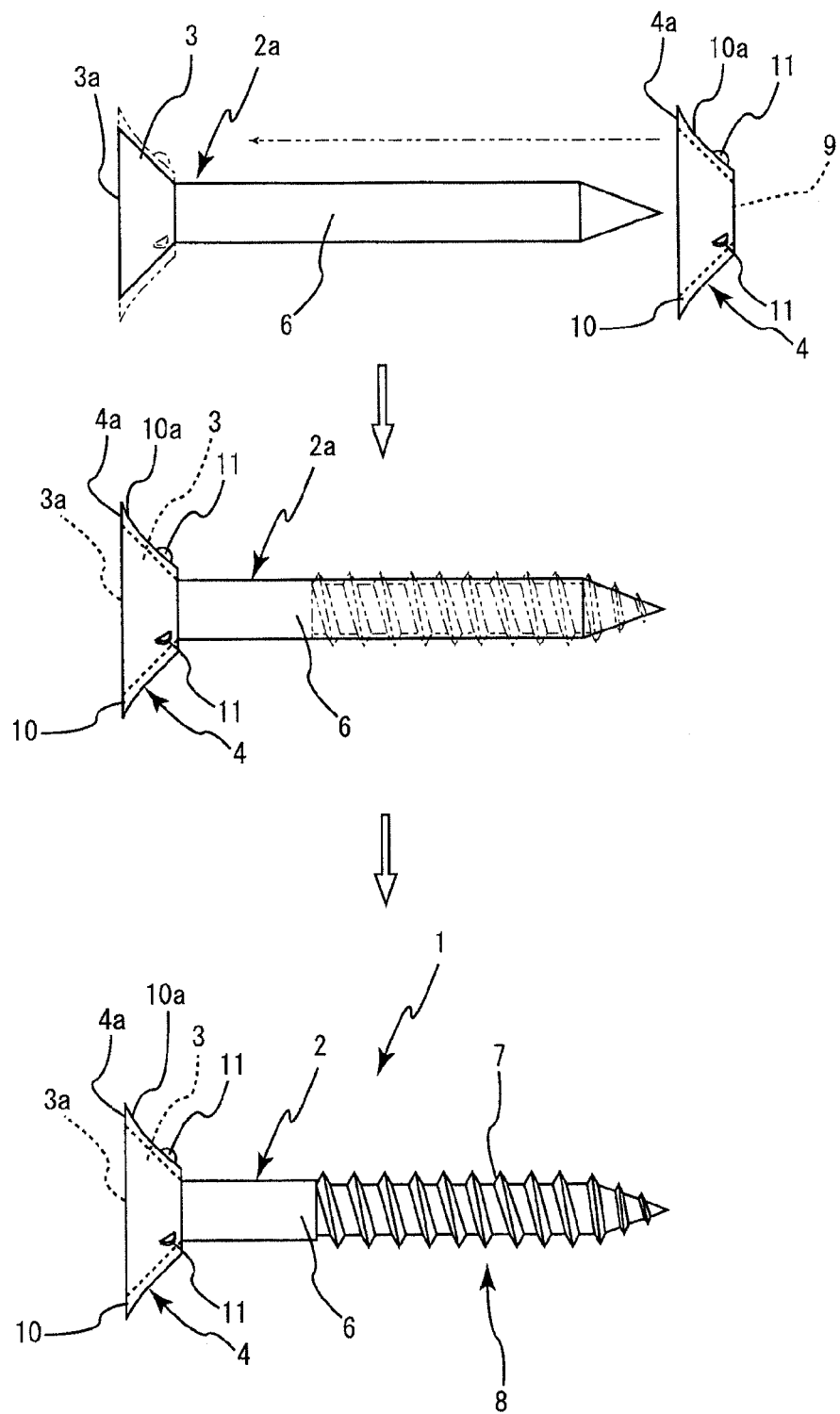
FIG. 8 is an explanatory diagram of manufacturing states according to the first embodiment of the present invention.

The present invention according to the embodiments in the drawings will hereinafter be described in detail.

According to a first embodiment of the present invention shown in FIG. 1 to FIG. 10, reference number 1 represents a wood screw of the present invention. The wood screw 1 is configured by a wood screw main body 2 and a truncated cone-shaped washer 4. The truncated cone-shaped washer 4 is rotatable in relation to a head 3 of the wood screw main body 2 such that a top surface 3a of the head and a top surface 4a of the washer 4 are substantially on the same plane, and is attached so as not to detach from the head 3.

An engaging groove 5 that engages with a Phillips screwdriver is formed in a truncated conical-shape in the head 3 of the wood screw main body 2. The wood screw 1 is also configured by a screw section p with a shaft section 6, integrally formed with the head section 3, provided between the screw section 8 and the head section 3. A tapping screw 7 is formed on the outer peripheral portion of the screw section 8, in which the diameter on the shaft section 6 side is larger than the outer diameter of the shaft section 6 and successively becomes smaller towards the tip portion.

The truncated cone-shaped washer 4 is rotatable in relation to the head 3 of the wood screw main body 2, and the top surface 3a of the head 3 and the top surface 4a of the washer 4 are substantially on the same plane. The washer 4 is configured by a truncated cone-shaped washer main body 10 and one or more (three according to the first embodiment of the present invention) rotation-preventing projections 11, 11, and 11. The washer main body 10 has a larger diameter than the shaft section 6 of the wood screw main body 2. A through hole 9 having a smaller diameter than the outer diameter dimension of the tapping screw 7 is formed on the shaft section 6 side. The rotation-preventing projections 11, 11, and 11 are formed in an angled surface 10a area on the lower surface of the washer main body 10.

For the washer main body 10, a material composed of a substance conventionally used in washers is used, such as metal, plastic, or a composite material containing carbon.

The wood screw 1 of the present invention configured as described above can be manufactured such that the truncated cone-shaped washer 4 does not become detached by the truncated cone-shaped washer 4 being inserted into the wood screw main body 2a on which the tapping screw 7 is not formed, and being positioned to the head 3. The tapping screw 7 is then formed on the shaft by rolling, such as to have a larger diameter than the shaft.

Figure 9:
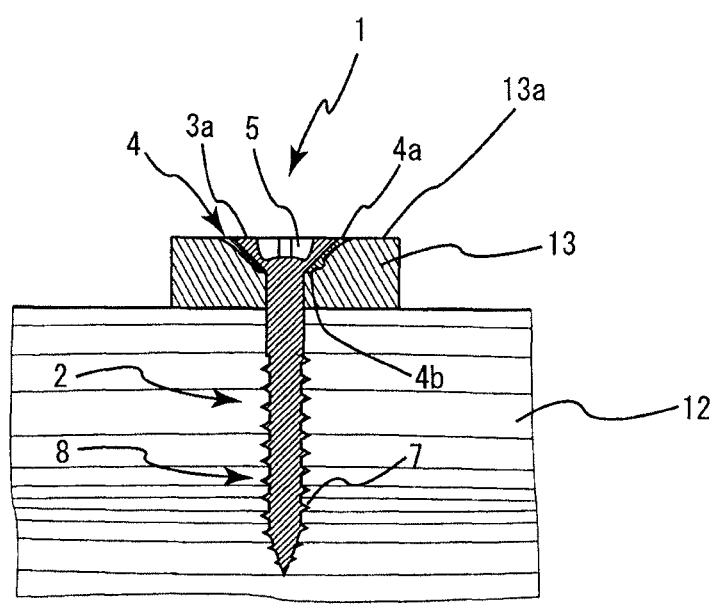
FIG. 9 is a cross-sectional explanatory diagram of a usage state according to the first embodiment of the present invention.
Figure 10:
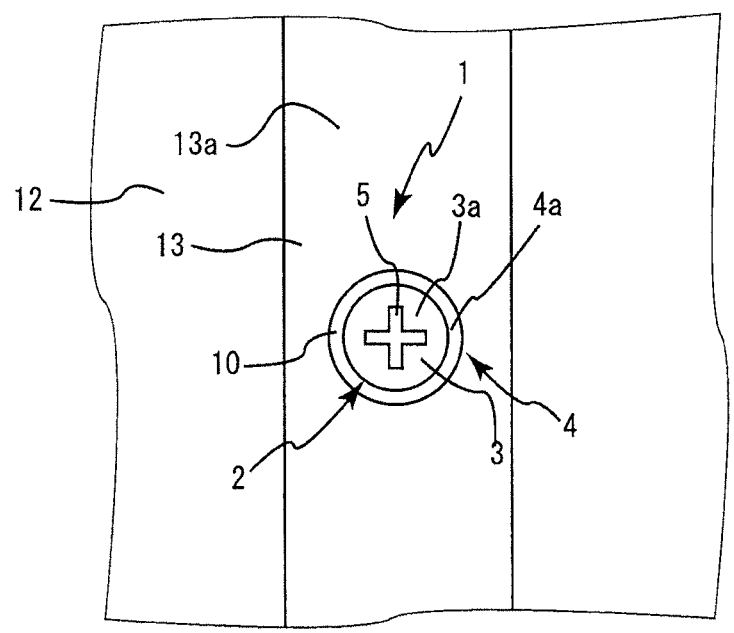
FIG. 10 is an explanatory diagram of the usage state according to the first embodiment of the present invention.

As shown in FIG. 9 and FIG. 10, the wood screw 1 configured as described above is fastened such that a retainer element 13, such as a wood material, a board, or a cloth-adhered board, is positioned to a wood 12 to be supported. The wood screw 1 is engaged with the wood 12 to be supported with the retainer element 13 therebetween, and the wood screw 1 is fastened such that the top surface 4a of the truncated cone-shaped washer 4, the top surface 3a of the head 3 of the wood main body 2 and a surface 13a of the retainer element 13 are on the same plane.

At this time, the rotational force of the wood screw main body 2 is not transmitted to the retainer element 13 that is in contact with the truncated cone-shaped washer 4, and only pressing force in the fastening direction is transmitted. Therefore, heat is not generated, and breakage can be efficiently prevented.

In addition, as a result of the rotation-preventing projections 11, 11, and 11 of the truncated cone-shaped washer 4, the rotational force of the truncated cone-shaped washer 4 is locked with certainty. The contact area between the lower surface 4b of the washer 4 and the retainer element 13 increases, thereby efficiently preventing breakage.

OTHER MODES FOR CARRYING OUT THE INVENTION

Next, other embodiments of the present invention shown in FIG. 11 to FIG. 19 will be described. In the descriptions of the other embodiments of the present invention, constituent sections that are the same as those according to the first embodiment of the present invention are given the same reference numbers. Redundant descriptions are omitted.

Figure 11:
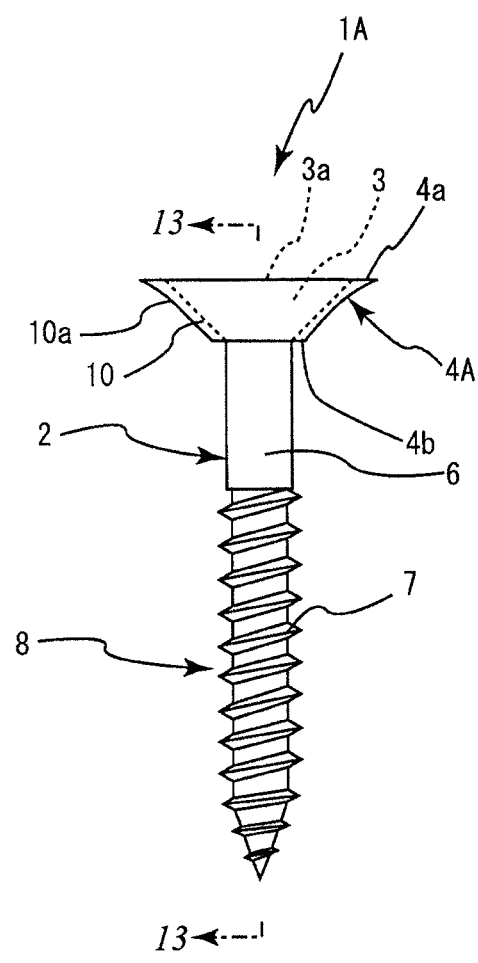
FIG. 11 is a front view according to a second embodiment of the present invention.
Figure 12:
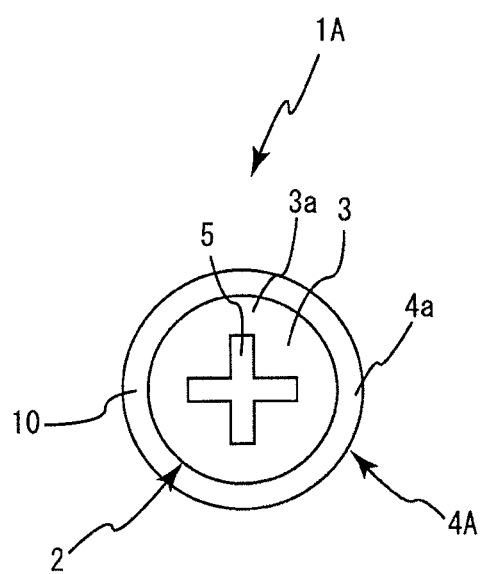
FIG. 12 is a planar view according to the second embodiment of the present invention.
Figure 13:
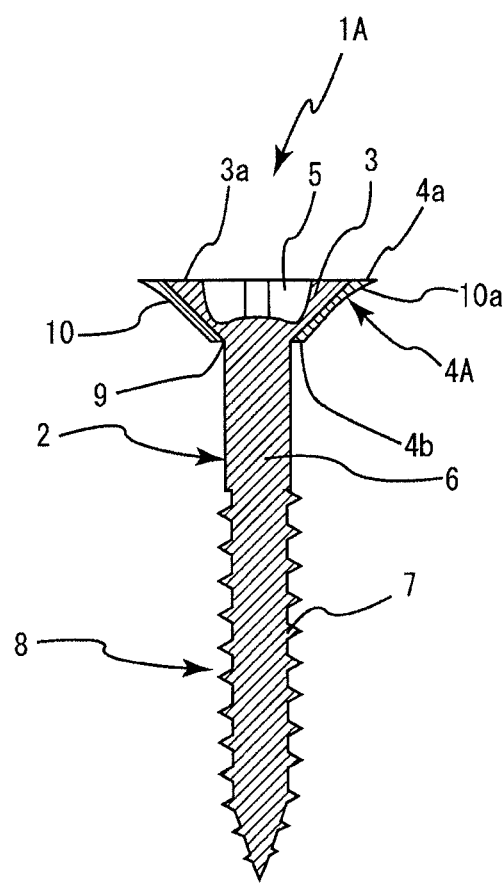
FIG. 13 is a cross-sectional view taken along line 13-13 in FIG. 11.

A second embodiment of the present invention shown in FIG. 11 to FIG. 13 differs from the first embodiment of the present invention in that a truncated cone-shaped washer 4A in which rotation-preventing projections are not formed is used. Even in a wood screw 1A configured using a truncated cone-shaped washer 4A such as this, similar operational effects as those according to the first embodiment of the present invention can be achieved.

Figure 14:
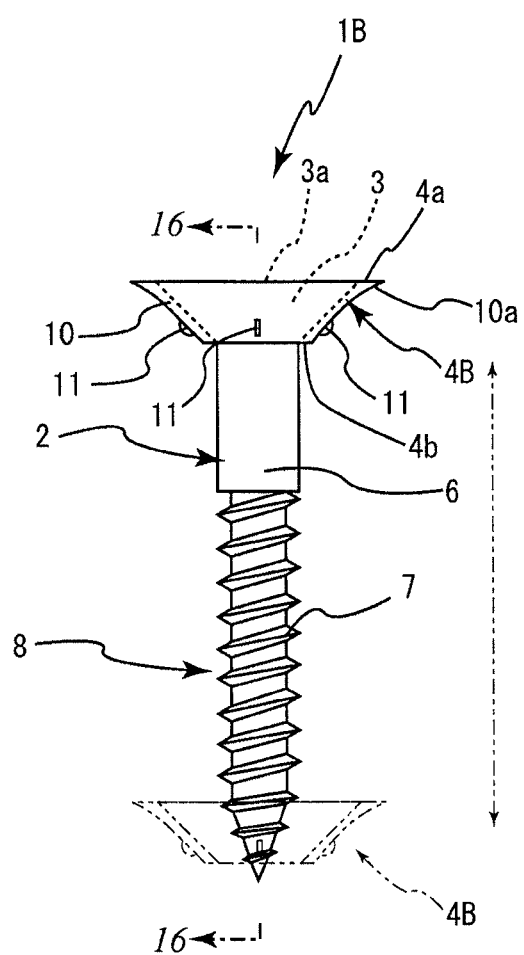
FIG. 14 is a front view according to a third embodiment of the present invention.
Figure 15:
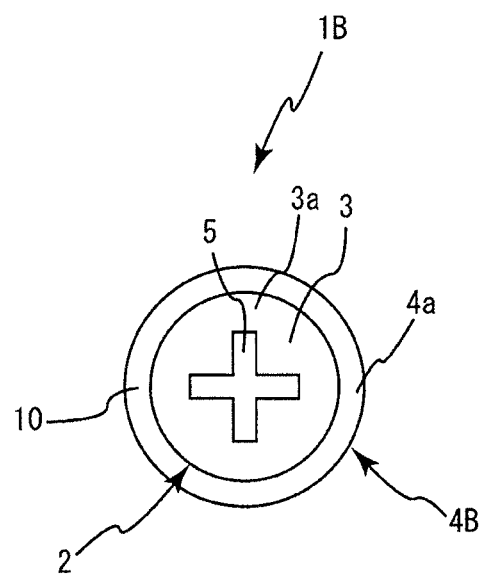
FIG. 15 is a planar view according to the third embodiment of the present invention.
Figure 16:
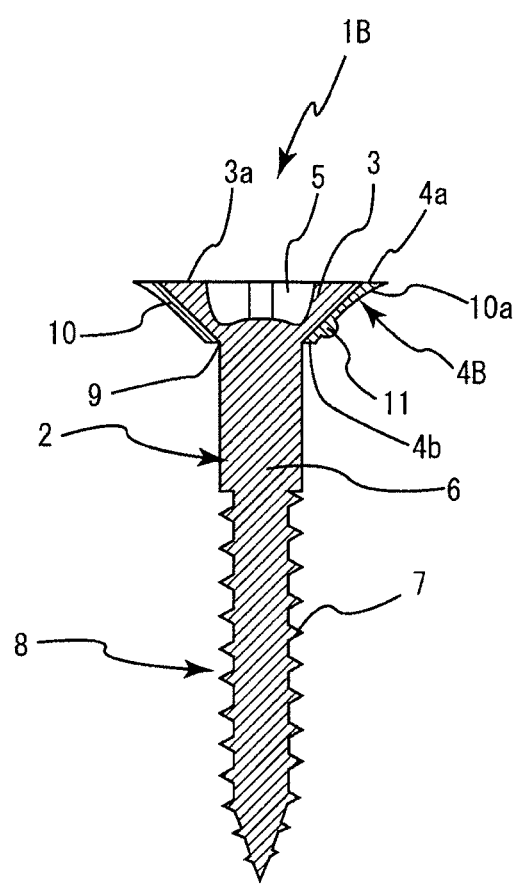
FIG. 16 is a cross-sectional view taken along line 16-16 in FIG. 14.

A third embodiment of the present invention shown in FIG. 14 to FIG. 16 differs from the first embodiment of the present invention in that a truncated cone-shaped washer 4B that can be removably attached to the wood screw main body 2 is used. Even in a wood screw 1B configured using a truncated cone-shaped washer 4B such as this, similar operational effects as those according to the first embodiment of the present invention can be achieved.

Figure 17:
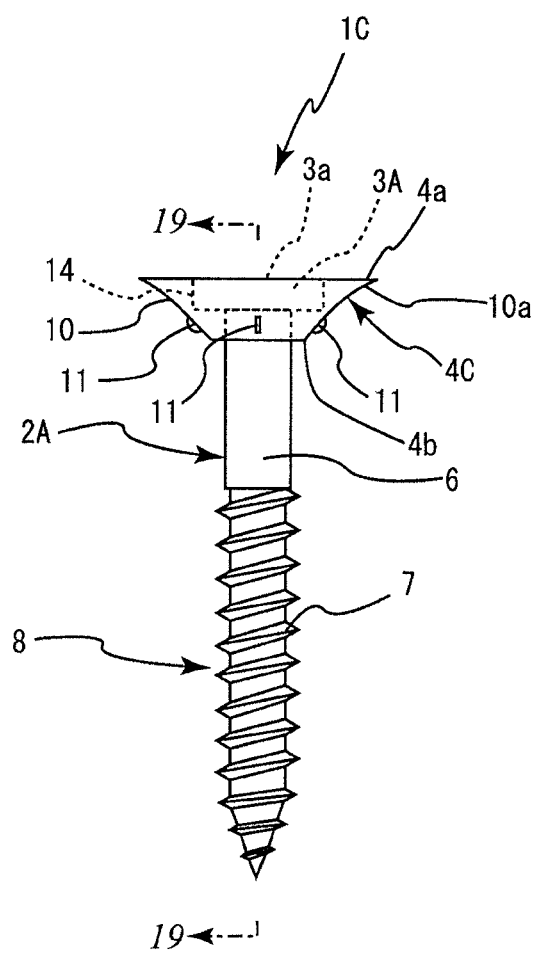
FIG. 17 is a front view according to a fourth embodiment of the present invention.
Figure 18:
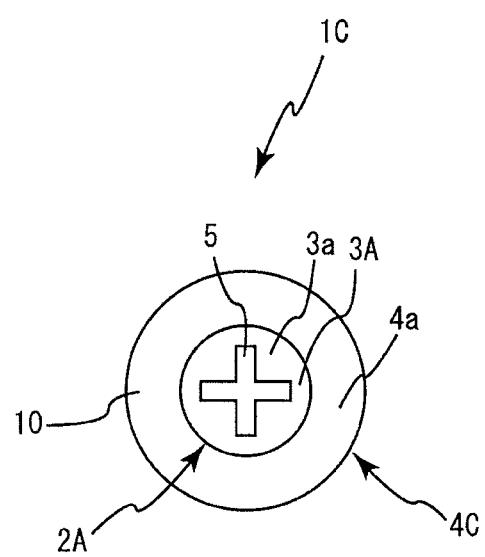
FIG. 18 is a planar view according to the fourth embodiment of the present invention.
Figure 19:
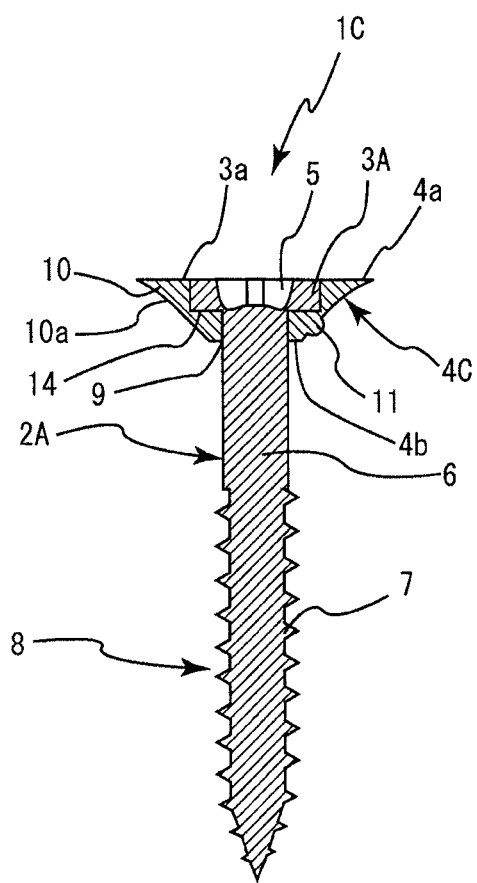
FIG. 19 is a cross-sectional view taken along line 19-19 in FIG. 17.

A fourth embodiment of the present invention shown in FIG. 17 to FIG. 19 differs from the first embodiment of the present invention in that a wood screw main body 2A and a truncated cone-shaped washer 4C are used. A circular disk-shaped head 3A is formed in the wood screw main body 2A. A head housing recess 14, in which the head 3A of the wood screw main body 2A is rotatably housed, and a top surface 3a of the head 3A and a top surface 4A are substantially on the same plane, is formed in the truncated cone-shaped, washer 4C. Even in a wood screw 1C configured using a wood screw main body 2A and a truncated cone-shaped washer 4C such as these, similar operational effects as those according to the first embodiment of the present invention can be achieved.

What is claimed is:

1. A wood screw and truncated cone-shaped washer attached to the wood screw in combination with a wood retainer, the combination being attachable to a wood surface for supporting said wood surface and comprising:
 a wood screw main body defining a screw section;
 the truncated cone-shaped washer being rotatable in relation to a head of the wood screw main body such that a top surface of the head and a top surface of the truncated cone-shaped washer are substantially on the same plane, and attached so as not to detach from the head and screw section; and
 wherein the truncated cone-shaped washer comprises a plurality of rotation-preventing projections, each one projection of said plurality of rotation-preventing projections projecting outward from a first portion of a circumferential outer surface of the truncated cone-shaped washer that is away from a lower edge of the truncated cone-shaped washer so that a second portion of the circumferential outer surface not part of said one projection occurs axially between the first portion of the circumferential outer surface of the truncated cone-shaped washer and said lower edge of the truncated cone-shaped washer; and wherein said each one projection extends only within a region between the top surface of the truncated cone-shaped washer and the lower edge of the truncated cone-shaped washer from said plane, and being configured for rotationally fixing the truncated cone-shaped washer against a surface of the wood retainer into which the wood screw is to enter.

2. A wood screw and truncated cone-shaped washer attached to the wood screw in combination with a wood retainer, the combination being attachable to a wood surface for supporting said wood surface and comprising:

a screw main body consisting of a head portion and a shall portion, the shaft portion having a tapping screw thread along at least a partial length of the shaft portion, the head portion having an upper surface along which a groove, configured for receiving a screwdriver, is formed, the head portion having a circumferential side surface extending from the upper surface toward the shall portion;

the truncated cone-shaped washer having a top surface, a circumferential outer surface, a circumferential inner surface, and a lower edge opposite the top surface, the circumferential inner surface bounding a through-opening receiving the head portion of the screw main body; and wherein the truncated cone-shaped washer is rotatable in relation to the head portion of the screw main body, and is configured so that the upper surface of the head portion and a top surface of the truncated cone-shaped washer are substantially flush within a same plane;

wherein the circumferential outer surface is shaped as a truncated cone, the circumferential inner surface is configured for receiving the circumferential side surface of the head portion, and the circumferential outer surface and the circumferential inner surface each have a respective axial height that is at least as great as an axial height of the head portion;

wherein the truncated cone-shaped washer comprises at plurality of rotation-preventing projections, each one projection of said plurality of rotation-preventing projections projecting outward from a first portion of the circumferential outer surface that is away from the lower edge so that a second portion of the circumferential outer surface not part of said one projection occurs axially between said first portion and said lower edge; and wherein said each one projection extends only within a region between the top surface of the truncated cone-shaped washer and a lower edge of the truncated cone-shaped washer away from said plane, and being configured for rotationally fixing the truncated cone-shaped washer against a surface into which the wood screw is to enter.

3. The wood screw of claim 2, wherein an open end of the through-opening at the lower edge of the truncated cone-shaped washer has a diameter less than a widest diameter of the tapping screw thread or the shaft portion.

4. A wood screw and truncated cone-shaped washer attached to the wood screw in combination with a wood retainer, the combination being attachable to a wood surface for supporting said wood surface and comprising:

a wood screw main body defining a screw section;

the truncated cone-shaped washer being rotatable in relation to a head of the wood screw main body such that a top surface of the head and a top surface of the truncated cone-shaped washer are substantially on a same plane, and attached so as not to detach from the head and the screw section; and wherein the washer is composed of a truncated cone-shaped washer main body and a rotation-preventing projection formed in an angled surface area on a lower surface of the truncated cone-shaped washer main body; and wherein the truncated cone-shaped washer has a through-opening with an open end at a lower edge of the truncated cone-shaped washer having a diameter less than a widest diameter of a tapping screw thread of the shaft main body.

* * * * *